United States Patent [19]

Kaneko et al.

[11] Patent Number: 5,675,233

[45] Date of Patent: Oct. 7, 1997

[54] CHARGING VOLTAGE DISTRIBUTION APPARATUS FOR SERIES BATTERIES

[75] Inventors: Akira Kaneko, Fukushima; Takashi Hiramatsu, Kanagawa, both of Japan

[73] Assignees: Integran, Inc.; Japan Tobacco Inc., both of Tokyo, Japan

[21] Appl. No.: 559,871

[22] Filed: Nov. 20, 1995

[30] Foreign Application Priority Data

Mar. 20, 1995 [JP] Japan ................................. 7-887477

[51] Int. Cl.$^6$ ................................................. H01M 10/46
[52] U.S. Cl. ................................................. 320/15; 320/18
[58] Field of Search ........................... 320/6, 8, 15, 16, 320/18, 30, 39, 40

[56] References Cited

U.S. PATENT DOCUMENTS

| | | | |
|---|---|---|---|
| 4,238,721 | 12/1980 | De Luca et al. | 320/18 |
| 5,153,496 | 10/1992 | LaForge | 320/17 |
| 5,206,578 | 4/1993 | Nor | 320/14 |
| 5,387,857 | 2/1995 | Honda et al. | 320/18 |
| 5,498,950 | 3/1996 | Ouwerkerk | 320/18 |

Primary Examiner—Edward Tso

[57] ABSTRACT

A charging voltage distribution apparatus dedicated to a charging apparatus for charging batteries connected in series comprises bypass circuits 15A and 15B connected in parallel with each of batteries B1, B2, etc. and a control circuit (consisting of circuit elements 4, 5, 6, 7, 8, 9, 11, 12, 13, and switches) for controlling amount of current to be routed into the bypass circuits 15A and 15B according to the voltage of a battery connected to the bypass circuits 15A and 15B. When the voltage of the battery exceeds a predetermined value, the control circuit makes the current to be routed into the bypass circuits 15A and 15B. When the batteries B1, B2, etc. connected in series have voltages exceeding the predetermined value, current is routed into the bypass circuits 15A and 15B. When the batteries have voltages lower than the predetermined value, charging current is fed for charging. Switching of current from the battery to the bypass circuits 15A and 15B or vice versa by means of the control circuit is achieved by making or breaking the switching devices SW1 and SW2 in the bypass circuits according to the voltage of the battery. The amount of current to be routed to the bypass circuits is determined by controlling the making and breaking durations of the switching devices.

22 Claims, 5 Drawing Sheets

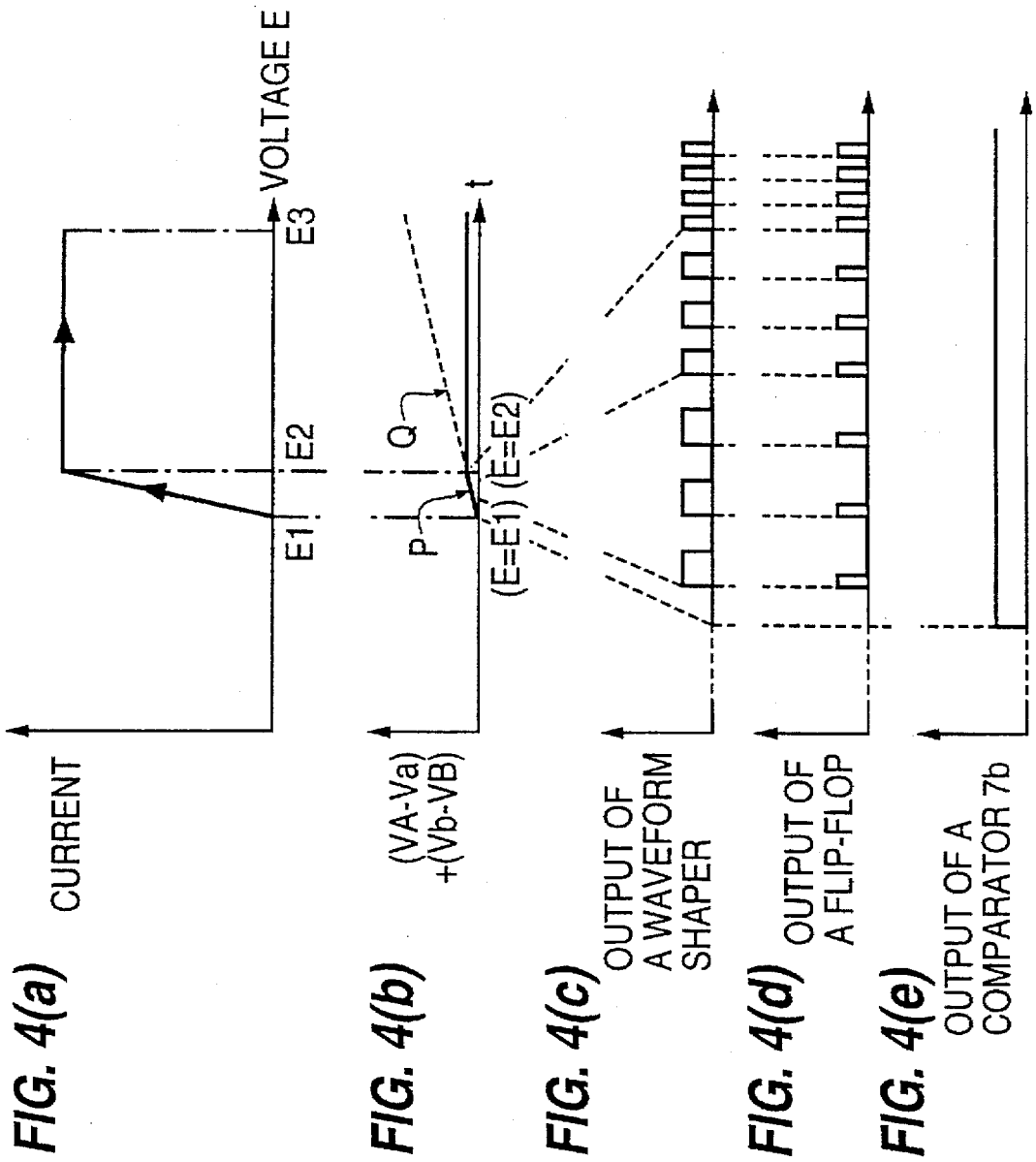

VOLTAGE-CURRENT CHARACTERISTIC OF A SWITCHING DEVICE

CHARGING VOLTAGE DISTRIBUTION APPARATUS FOR SERIES BATTERIES

BACKGROUND OF THE INVENTION

1. Field of the Invention

The present invention relates to a charging voltage distribution apparatus for series batteries, and more particularly, to an apparatus for effecting the voltage-charging of serially-connected batteries which are mounted on an electric vehicle or a hybrid vehicle or which are used as an electric power storage device in an electric power supply system, by distributing the voltage generated by a regenerative electric motor mounted on the vehicle to individual batteries or by distributing the voltage supplied from a high-voltage charging apparatus for the power supply system to individual batteries.

2. Description of the Related Art

An internal combustion engine emits low-grade exhaust gas resulting from poor combustion of fuel in the engine when a large load is applied to the engine, such as for example, when an automobile starts from standstill or runs on an ascending slope. This poses environmental problems.

In recent years, hybrid automobiles mounted with both an internal combustion engine such as a Diesel engine and an electric motor, especially hybrid heavy-duty trucks, have come to public attention in view of environmental preservation. The hybrid automobile is advantageous in that it is capable of simultaneously driving the electric motor and the internal combustion engine, where required or all the times, thus reducing the engine load and hence the emission of low-grade exhaust gas caused by poor combustion of the fuel in the internal combustion engine.

A hybrid automobile of a type equipped with a regenerative electric motor is known, in which the motor is connected across a battery array mounted on the automobile and comprised of batteries connected in series with one another. The hybrid automobile equipped with the regenerative motor is advantageous in that the batter charging can be made even during vehicle traveling, as explained hereinbelow.

While the vehicle is descending a slope or is slowing down by the application of the brakes, the electric motor is forcibly turned by the torque of the vehicle wheels to which the motor is coupled, so that it will function as a generator. An electric current produced by the motor is supplied to the battery array at its positive terminal to charge the batteries, whereby kinetic energy is recovered. Ordinarily, on the other hand, an electric current is fed from the battery array through its positive terminal to the motor, so that the vehicle is driven by the motor.

As with the hybrid automobile, an electric automobile can be equipped with a regenerative electric motor for charging batteries mounted thereon.

In the electric power industry, the charging of numerous batteries installed for the purpose of storage of electric power in an electric power company or the like is carried out with use of a high-voltage charging apparatus.

Conventional battery charging has drawbacks as will be explained below.

In general, a battery has its optimum charging voltage which is dependent on the property and the temperature of the battery. Batteries have different properties from one another varying within a manufacturing tolerance. Moreover, in an actual use, batteries are disposed in different heat radiation conditions to have different temperatures from one another. The optimal charging voltage therefore differs from battery to battery.

Conventionally, however, regardless of this, series charging has been practiced for the batteries which are connected in series with one another. The series charging causes an electric current to flow equally through the serially-connected batteries. Even if the differences in internal resistance among the batteries are small at the beginning, the differences in internal resistance among the batteries increases each time the serial charging is conducted. Thus, the repetitive series charging causes the differences in internal resistance and hence differences in battery capacity among the batteries to increase gradually. In the conventional series charging, as mentioned above, an electric current flows equally through the serially-connected batteries of good performance and poor performance. This poses a problem that inferior batteries with a large amount of residual current may be overcharged to cause gassing, rise of internal pressures, and generation of hydrogen gas, which ends up with damage to the inferior batteries. On the other hand, good batteries retaining a small amount of residual current may be undercharged, posing another problem of conventional series charging. Even if the serially-connected batteries include a single inferior battery alone, the remaining good batteries are undercharged.

Repetitive overcharging of inferior batteries and repetitive undercharging of good batteries cause even the service lives of good batteries to be shortened significantly. This necessitates an early replacement of the batteries, including the good batteries.

OBJECTS AND SUMMARY OF THE INVENTION

An object of the present invention is to provide a charging voltage distribution apparatus capable of distributing the charging voltage among serially-connected batteries in a manner such that an optimal charging voltage can be applied to each of the batteries.

Another object of the present invention is to provide a charging voltage distribution apparatus capable of charging serially-connected batteries with their optimal charging voltages by causing the current, applied to that one of the batteries which is fully charged and is about to be overcharged, to be diverted to other incompletely charged batteries, thereby preventing undercharging or overcharging of individual batteries, and contributing to extension of the service lives of the individual batteries.

According to the present invention, a charging voltage distribution apparatus for series batteries is provided, which comprises: charging voltage distribution sections each of which is connected in parallel with an associated one of the series batteries, said each charging voltage distribution section including a bypass circuit and a control circuit; said bypass circuit of said each charging voltage distribution section being connected in parallel with the associated battery; and said control circuit of said each charging voltage distribution section being operable to continuously variably control an amount of current flowing through the associated bypass circuit according to a charging voltage applied to the associated battery.

BRIEF DESCRIPTION OF THE DRAWINGS

FIG. 4(a) through FIG. 4(e) are graphs illustrating time-based changes in outputs of an adder, comparator, waveform shaper, and flip-flop circuit which are shown in FIG. 2.

DETAILED DESCRIPTION OF THE PREFERRED EMBODIMENTS

Referring to FIGS. 1 through 4, a charging voltage distribution apparatus according to an embodiment of the present invention will be described in detail.

Figure 1:
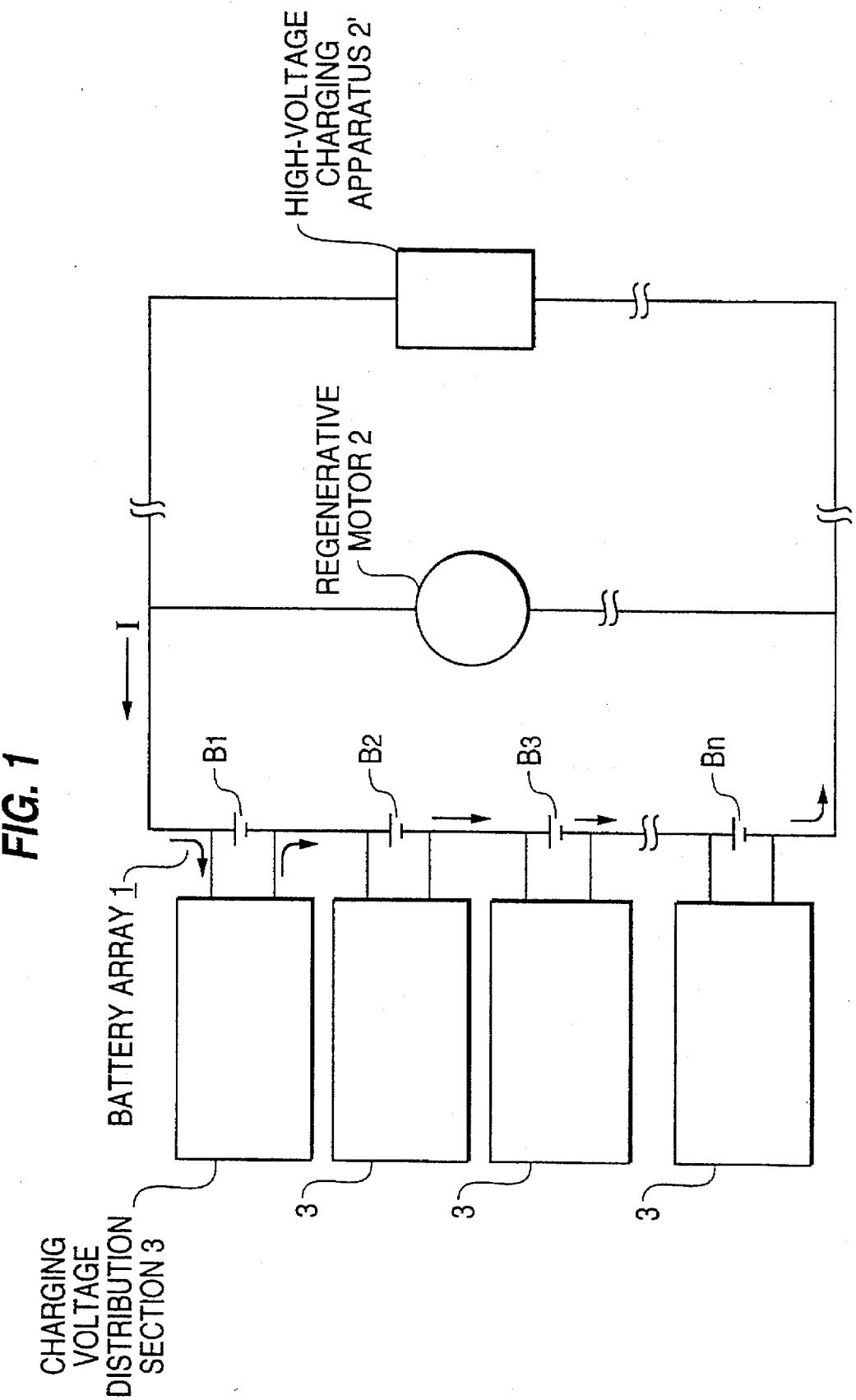
FIG. 1 is a circuit block diagram showing a charging voltage distribution apparatus according to an embodiment of the present invention.

In FIG. 1, a plurality of batteries B1, B2, B3, . . . , and Bn are connected in series with one another to constitute a series battery array. The series battery array has the both terminals connected respectively to both terminals of a regenerative electric motor 2 and to both terminals of a high-voltage charging apparatus 2', thereby forming a series circuit of the battery array and the regenerative motor and another serial circuit of the battery array and the charging apparatus 2'. The charging voltage distribution apparatus includes N charging voltage distribution sections 3 which are the same in number as that of the batteries. Each distribution section is connected in parallel with a corresponding one of the batteries B1, B2, B3, . . . , and Bn.

Figure 2:
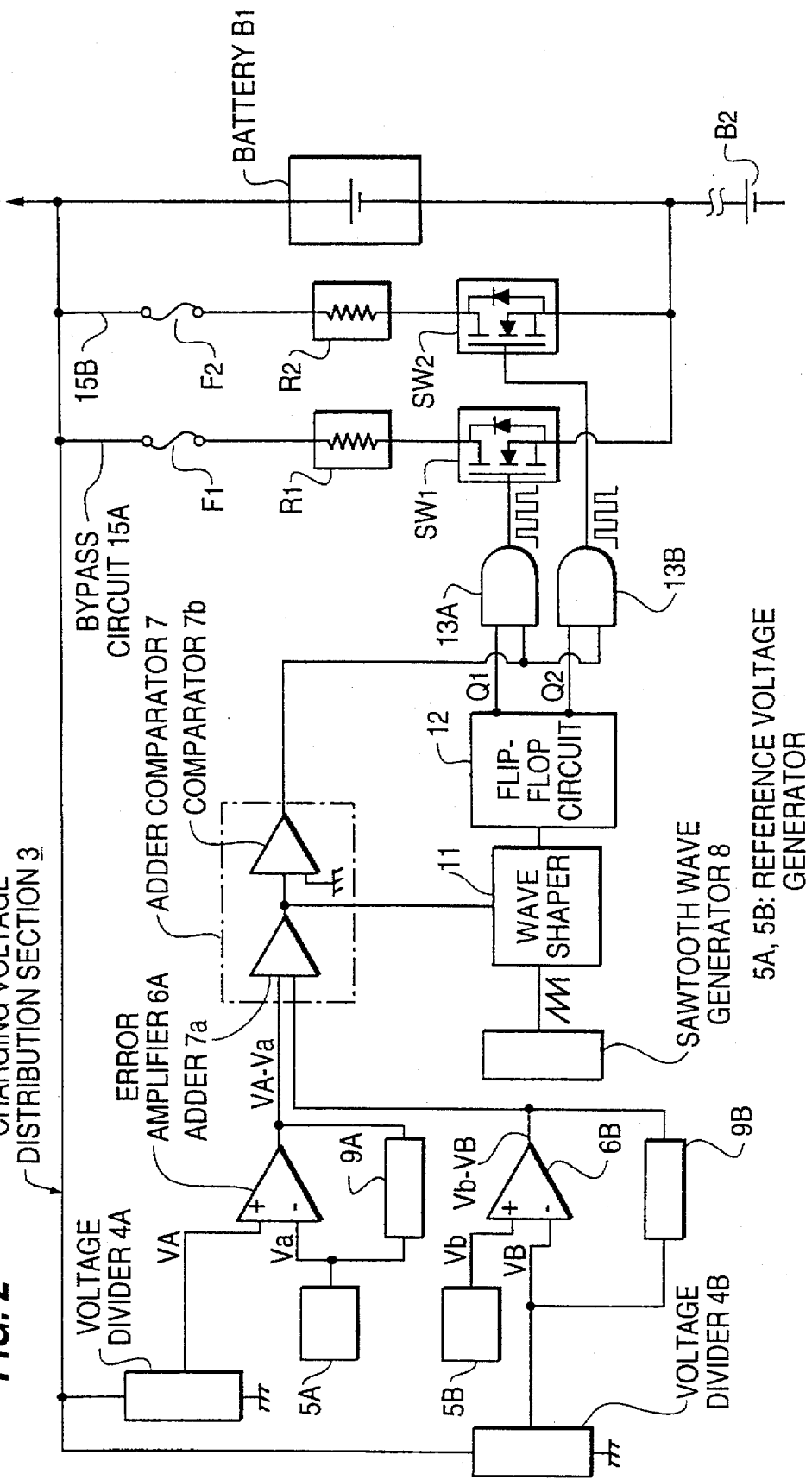
FIG. 2 is a circuit diagram showing a charging voltage distribution section of the apparatus shown in FIG. 1.

Next, the composition of the charging voltage distribution section 3 will be described referring to FIG. 2. In FIG. 2, the charging voltage distribution section 3 is connected in parallel with the battery B1 of the series battery array. Reference numerals 4A and 4B denote first and second voltage dividers for dividing a charging voltage applied to the battery B1 at predetermined first and second ratios, respectively. Reference numerals 5A and 5B denote first and second reference voltage generators for generating predetermined first and second reference voltages, respectively. The reference voltages may be generated by regulating the charging voltage applied to the battery array. Reference numerals 6A and 6B denote first and second error amplifiers, respectively. The first error amplifier 6A generates a first difference between the first divided voltage provided by the first voltage divider 4A and the first reference voltage provided by the first reference voltage generator 5A, and then amplifies the first voltage difference. The second error amplifier 6B generates a second difference between the second divided voltage provided by the second voltage divider 4B and the second reference voltage provided by the second reference voltage generator 5B, and then amplifies the second voltage difference. Reference numeral 7 denotes an adder comparator combination 7 composed of an adder 7a and a comparator 7b. The adder comparator combination 7 has the input terminals thereof respectively connected to the error amplifiers 6A and 6B, uses the adder 7a to add up first and second outputs of the first and second error amplifiers 6A and 6B, outputs the sum of these amplifier outputs to a waveform shaper 11, uses the comparator 7b to compare the summation output with a set value supplied to the comparator 7b, and then outputs the result of the comparison to first and second amplifiers 13A and 13B. The first voltage divider 4A has its output terminal connected to the non-inverting input terminal of the first error amplifier 6A, and the first reference voltage generator 5A has its output terminal connected to the inverting input terminal of the amplifier 6A. A first feedback resistor 9A is connected in parallel with the error amplifier 6A between the output terminal and the inverting input terminal of the error amplifier 6A, whereby a first feedback circuit is constituted. The second reference voltage generator 5B has its output terminal connected to the non-inverting input terminal of the second error amplifier 6B, and the output terminal of the second voltage divider 4B is connected to the inverting input terminal of the amplifier 6B. A second feedback resistor 9B is connected in parallel with the second error amplifier 6B between the output terminal and the inverting input terminal of the error amplifier 6B, whereby a second feedback circuit is constituted. The first and second feedback circuits serve to provide the error amplifiers 6A, 6B with a linearly increasing error amplification voltage characteristic, and also to set a maximum value of bypass currents flowing through first and second bypass circuits 15A and 15B by setting the amplification factors of the error amplifiers 6A, 6B.

The waveform shaper 11 changes the frequency of a sawtooth wave generated by a sawtooth wave generator 8 according to a sum of the outputs of the amplifiers 6A, 6B. This summation output is provided by the adder 7a in the adder comparator combination 7. For example, a voltage-to-frequency converting circuit may be used to provide the waveform shaper 11. By the voltage-to-frequency conversion in the waveform shaper 11, a series of pulse signals is generated. The greater the difference between the first voltage difference obtained by the first error amplifier 6A and the second voltage difference obtained by the second error amplifier 6B, the higher the frequency of the pulse signal to be output from the waveform shaper 11.

Reference numeral 12 denotes a flip-flop circuit. The flip-flop circuit 12 receives the pulse signal from the waveform shaper 11, and outputs two series of first and second pulse signals each having a predetermined pulse width from its output terminals Q1 and Q2 to respective first input terminals of the amplifiers 13A and 13B in synchronous with the received pulse signal from the waveform shaper 11. Reference numerals 13A and 13B respectively denote first and second amplifiers each having the function of an AND circuit. The amplifiers 13A and 13B receive, at their respective second input terminals, the output of the comparator 7b of the adder comparator combination 7 and receive, at their respective first input terminals, the first and second pulse signals provided by the flip-flop circuit 12, to carry out the logical AND between the comparator output and one of the pulse signals and between the comparator output and the other pulse signal, thereby obtaining third and fourth pulse signals. These pulse signals are delivered to first and second switching devices SW1 and SW2 connected individually to the amplifiers 13A and 13B. The third and fourth pulse signals serve as control signals for switching control of the switching devices SW1 and SW2.

The first switching device SW1 cooperates with a fuse F1 and a resistor R1 which are connected in series therewith to form a first bypass circuit 15A, and the second switching device SW2 cooperates with a fuse F2 and a resistor R2 connected in series therewith to form a second bypass circuit 15B. These two bypass circuits 15A and 15B are connected in parallel with the battery B1.

The operation of the system shown in FIG. 1 will be explained below.

When a large load is imposed on an engine, for example, when a hybrid automobile or electric automobile mounted with the elements 1, 2 and 3 is started, accelerated, or climbing a slope, current is supplied from the battery array 1 to the regenerative motor 2 through the positive electrode of the battery array 1, whereby the regenerative motor 2 is made to operate as an auxiliary power source for the engine. In this case, the batteries B1, B2, B3, . . . , and Bn are discharged gradually.

When the driving force to be produced by the motor 2 is not needed, for example, when the automobile is descending a slope or braking, the regenerative motor 2 is rotated forcibly by means of the torque provided by wheels of the automobile so that the regenerative motor 2 will act as a generator. Current produced by the motor 2 is supplied, as battery charging current I, to the battery array 1 through its positive electrode so that the current will flow into it in the order of the batteries B1, B2, B3, . . . , and Bn, which are connected in series with one another and each of which is connected in parallel with a corresponding one of the charging voltage distribution sections 3.

Taking the battery B1 as an example the first and second voltage dividers 4A and 4B in the charging voltage distribution section 3 shown in FIG. 2 divide the voltage applied to the battery B1 at predetermined ratios and output the divided voltages VA and VB, respectively. Assuming that the voltage applied to the battery B1 is E and the voltage division ratios set in the first and second voltage dividers 4A and 4B are K1 and K2, respectively, the output voltage VA of the voltage divider 4A may be expressed as K1·E (where the symbol · means multiplication) and the output voltage VB of the voltage divider 4B may be expressed as K2·E.

The reference voltage generators 5A and 5B use the charging voltage applied to the battery array to generate predetermined first and second reference voltages Va and Vb, respectively.

The first error amplifier 6A outputs a first voltage difference between the output voltage VA of the first voltage divider 4A and the first reference voltage Va provided by the first reference voltage generator 5A. The second error amplifier 6B outputs a second voltage difference between the output voltage VB of the second voltage divider 4B and the second reference voltage Vb supplied from the second reference voltage generator 5B. These first and second voltage differences are supplied to the adder comparator combination 7. The error amplifier 6A and the error amplifier 6B are connected to their peripheral elements such that their outputs change in opposite directions from each other when the charging voltage varies. Thus, the first and second voltage differences obtained in the error amplifiers 6A and 6B are represented by (VA—Va) and (Vb—VB), respectively. The feedback resistors 9A and 9B connected to the error amplifiers 6A and 6B and constituting the feedback circuits provide the error amplifiers 6A, 6B with a linearly increasing error amplification voltage characteristic and set the amplification factors of the error amplifiers such as to set a maximum value of bypass currents flowing through the bypass circuits 15A and 15B.

Figure 3A:
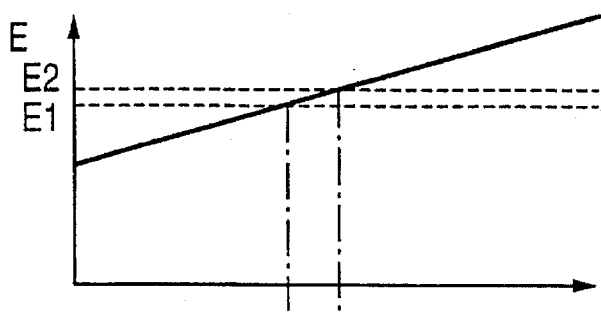
FIG. 3(a) through FIG. 3(f) are graphs illustrating changes in voltages, with elapse of time, appearing at various parts of the charging voltage-distribution section shown in FIG. 2.
Figure 3B:
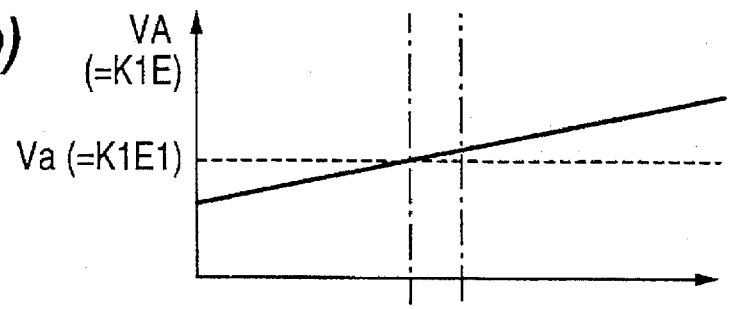
Figure 3C:
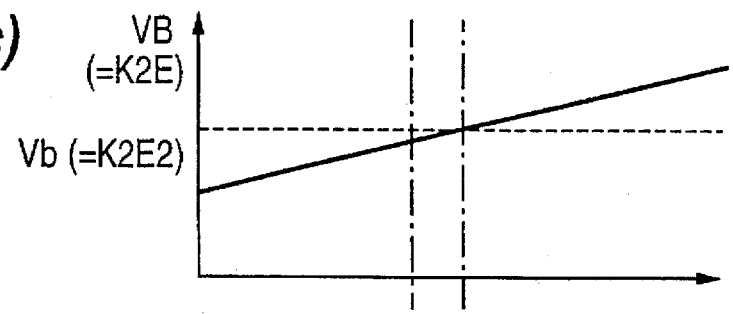

FIGS. 3(b) through 3(f) are diagrams illustrating changes in the voltages appearing at various portions of the charging voltage distribution section 3 as the charging voltage E applied to the associated battery varies as shown in FIG. 3(a), wherein an optimal charging voltage for the battery is E1 and a maximum applied voltage (maximum allowable charging voltage) for the battery is E2. FIG. 3(b) shows a change in the divided voltage VA provided by the voltage divider 4A. FIG. 3(c) shows a change in the divided voltage VB provided by the voltage divider 4B.

In FIG. 3(b), the first reference voltage Va is set to a value equal to the product K1·E1 of the voltage division ratio K1 set in the first voltage divider 4A and the optimum charging voltage E1. The voltage divider 4A outputs a voltage VA (=K1·E) which varies dependent on the charging voltage E. When the charging voltage E is equal to the voltage E1, the divided voltage VA becomes equal to the reference voltage Va. In FIG. 3(c), the second reference voltage Vb is set to a value equal to the product K2·E2 of the voltage division ratio K2 set in the second voltage divider 4B and the maximum allowable charging voltage E2. The voltage divider 4B outputs a voltage VB (=K2·E) which varies dependent on the charging voltage E. When the charging voltage E is equal to the voltage E2, the divided voltage VB becomes equal to the reference voltage Vb.

Figure 3D:
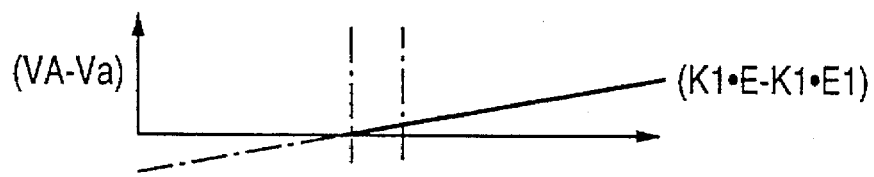
Figure 3E:
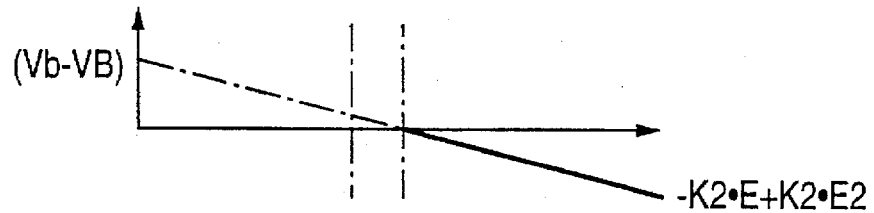

FIG. 3(d) shows a change in the voltage difference (VA–Va) (=(K1·E–K1·E1)) between the divided voltage VA and the reference voltage Va, i.e., a change in the output of the first error amplifier 6A. When the charging voltage E is higher than the optimum charging voltage E1, the amplifier 6A outputs a positive voltage. FIG. 3(e) shows a change in the voltage difference (Vb–VB) (=(–K2·E+K2·E2)) between the divided voltage VB and the reference voltage Vb, i.e., a change in the output of the second error amplifier 6B. When the charging voltage E is higher than the maximum allowable charging voltage E2, the amplifier 6B outputs a negative voltage.

Figure 3F:
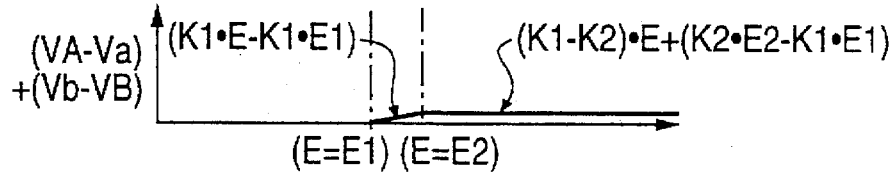

The adder 7a in the adder comparator combination 7 adds up the outputs (VA–Va) and (Vb–VB) of the first and second error amplifiers 6A and 6B, thereby obtaining a summation output (VA–Va+Vb–VB). FIG. 3(f) shows a change in the output (VA–Va+Vb–VB) of the adder 7a. As seen from FIG. 3(f), when the charging voltage E ranges from E1 to E2, the summation output (VA–Va+Vb–VB) changes to follow the voltage (K1·E–K1·E1) equivalent to the first voltage difference (VA–Va). When the charging voltage E exceeds the voltage E2, the output (VA–Va+Vb–VB) changes to follow the voltage (K1·E–K1·E1—K2·E+K2·E2) equivalent to the summation (VA–Va+Vb–VB) of the first and second voltage differences.

In case that the first and second voltage division ratios K1 and K2 are made equal to each other, when the charging voltage is higher than the voltage E2, the output of the adder 7a has a constant value (K2·E2–K1·E1).

The comparator 7b compares the output of the adder 7a with a set value. For example, when the set value is 0 V, the comparator 7b sends an output signal, corresponding to the output of the adder 7a shown in FIG. 3(f), to each of the amplifiers 13A and 13B.

The charging voltage E in the initial stage of charging is lower than the optimal charging voltage E1, and so, as shown in FIG. 3(f), neither the adder 7a nor the comparator 7b outputs a signal. Assuming that, in the battery array 1, the batteries are arranged in the order of B1 with the largest amount of remaining charge (a battery of poor performance because of a large amount of unused charge), B2, B3, . . . , Bn with the least amount of remaining charge (a battery of good performance because of a small amount of unused charge), the charging of the battery B1 having the largest amount of unused charge will be completed first. In the battery B1, the charging voltage E tends to rise higher than the optimal charging voltage E1.

In this case, the divided voltage VA provided by the voltage divider 4A is represented by (K1·E), while the divided voltage VB provided by the voltage divider 4 is represented by (K2·E). The reference voltage generators 5A and 5B are designed to generate the reference voltages Va and Vb represented by (K1·E1) and (K2·E2), respectively, so that the adder 7a outputs the voltage (K1·E–K1·E1).

The waveform shaper 11 changes the frequency of a sawtooth wave fed by the sawtooth wave generator 8 according to the output voltage of the adder 7a, and supplies a series of pulse signals to the flip-flop circuit 12. The waveform shaper 11 performs the voltage-frequency conversion in such a manner that the frequency at which a series of the pulse signals is generated will become higher as the output voltage of the adder 7a will become larger.

FIG. 4 is a diagram illustrating the relationships among the outputs of the adder comparator combination, waveform shaper, and flip-flop circuit. In FIG. 4(b), when the charging voltage E exceeds the optimal charging voltage E1, the output of the adder 7a varies according to a voltage change indicated with symbol P. The waveform shaper 11 outputs a series of pulse signals whose generation cycle corresponds to the magnitude of the output of the adder 7a. As shown in FIGS. 4(d) and 4(e), the generation cycle of the pulse signal provided by the waveform shaper 11 becomes shorter as the voltage output of the adder 7a increases.

The flip-flop circuit 12 outputs two series of pulse signals, each having a fixed width, from output terminals Q1 and Q2 at intervals of cycle corresponding to the generation cycle of the series of pulse signal supplied from the flip-flop circuit 12 (Refer to FIG. 4 (d), in which only the output from one of the output terminals is shown). Thus, the duty ratio of the pulse signal provided by the flip-flop circuit 12 becomes higher as the output of the adder 7a increases, and the turn-on duration during which the pulse signal is at a high level will become longer correspondingly. The two series of pulse signals may be the same or different in phase from each other.

The comparator 7b starts outputting a signal when and after the charging voltage E exceeds the optimal charging voltage E1 (FIG. 4e).

The amplifier 13A carries out the logical AND between an output signal provided by the flip-flop circuit 12 through the output terminal Q1 thereof and a signal provided by the comparator 7b, amplifies the logical AND signal which is then sent as a control signal to the switching device SW1. Likewise, the amplifier 13B carries out the logical AND between an output signal provided by the flip-flop circuit 12 through the output terminal Q2 thereof and a signal provided by the comparator 7b, amplifies the resultant signal which is then sent as a control signal to the switching device SW2. The logical AND operations permit the charging current to be routed into the bypass circuits 15A and 15B only when the charging voltage for the associated battery exceeds the optimal charging voltage of the battery.

The output signals of the amplifiers 13A and 13B cause the switching devices SW1 and SW2 to be closed when they are at, e.g., a high level, whereby the on and off states of the bypass circuits 15A and 15B are controlled.

The on and off durations of the switching devices SW1 and SW2 are dependent on the duty ratio of a series of pulse signals provided by the flip-flop circuit 12. The duty ratio is determined with a signal sent from the adder 7a of the adder comparator combination 7. The longer the duration through which each of the switching devices SW1 and SW2 is closed, the larger the amount of current routed into a corresponding one of the bypass circuits 15A and 15B, whereby the charging voltage application to the battery connected in parallel with these bypass circuits can be limited.

Figure 5:
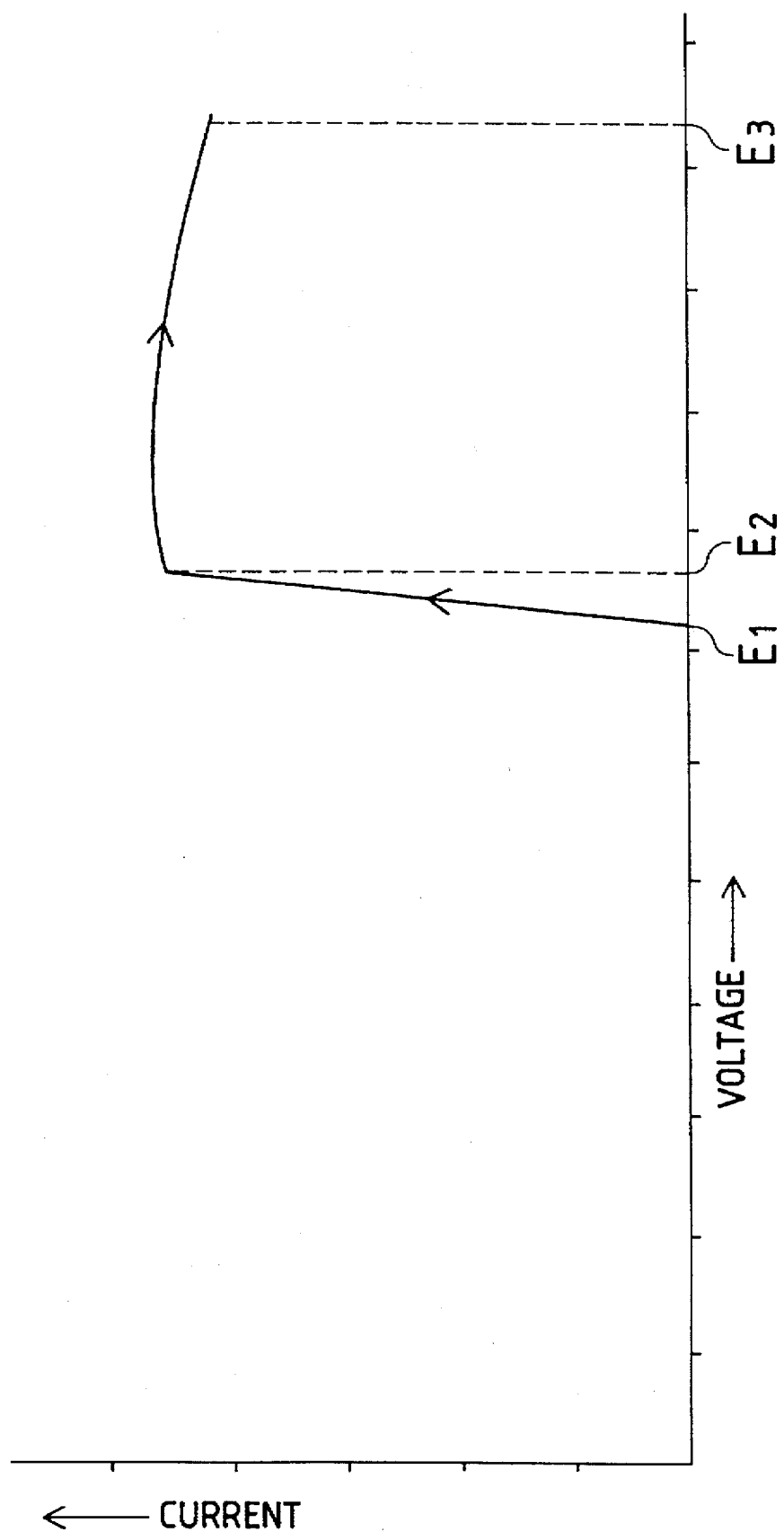
FIG. 5 is a graph showing the voltage-current characteristic of switching devices shown in FIG. 2.

Thus, as indicated with symbol P in FIG. 4b, as the voltage of the signal sent from the adder 7a increases, the generation cycle of the pulse signal sent from the waveform shaper 11 becomes shorter, and this causes the duty ratio of the pulse signal sent from the flip-flop circuit 12 to become higher; consequently, the amount of the current to be routed into the bypass circuits 15A and 15B increases. After the current starts to flow into the bypass circuits 15A and 15B, as shown in FIG. 5, the voltage across each of the switching devices rises from E1 to E2, and the bypass currents increase correspondingly.

When the bypass currents flowing into the bypass circuits 15A and 15B become overcurrents or excessive in magnitude, the switching devices SW1 and SW2 may be damaged although the provision of the two switching devices SW1, SW2 makes it possible to reduce electric load applied thereto as compared with an arrangement having a single switching device alone. The negative feedback resistors 9A and 9B connected in parallel with the error amplifiers 6A and 6B define amplification factors. When the charging voltage rises to exceed the set voltage E2, as shown in FIGS. 3(f) and 4(b), the rise of the voltage signal sent from the adder 7a is reduced to prevent the generation cycle of the pulse signal sent from the waveform shaper 11 from being shortened, thereby also preventing the turn-on duty ratio of the pulse signal sent from the flip-flop circuit 12 from increasing. Thus, the increase of the bypass current is suppressed.

The resistors R1 and R2 in the bypass circuits 15A and 15B act as damper for the switching devices SW1 and SW2. Heat generated by the resistors and heat generated by the switching devices SW1 and SW2 are removed using a radiator fan. Even when a large current is produced by the regenerative motor 2 accidentally, excessive current is turned to the heat in the resistors R1 and R2 and radiated into the air by means of the radiator fan. Thus, the circuit can be protected.

If the switching devices SW1 and SW2 should fail to operate normally, the bypass circuits 15A and 15B would continue to remain on-state, and the connection between the battery B1 and bypass circuits 15A and 15B would be short-circuited to form a loop, thereby causing the current to flow from the battery B1 into the switching devices SW1 and SW2. Consequently, the switching devices SW1 and SW2 may be damaged. For preventing the occurrence of such short-circuit, the fuses F1 and F2 are included in the bypass circuits 15A and 15B.

With this arrangement, when the charging voltage exceeds the optimal charging voltage, a substantial part of the charging current is routed as bypass current into the bypass circuits 15A and 15B. The amount of bypass current is controlled depending on the degree at which the charging voltage exceeds the optimal charging voltage. The amount of bypass current can be confined to a predetermined value.

As mentioned above, when the charging of the poor-performance battery B1 permitting only a small amount of discharge is completed first and the charging voltage exceeds the optimal charging voltage for the battery B1, the charging current is shunted to the bypass circuits 15A and 15B associated with the battery B1. The battery B2 in FIG. 1 is then charged, with the aid of the bypass currents flowing thereinto from the bypass circuits 15A and 15B for the battery B1. Likewise, with the aid of the bypass currents concerned, the remaining batteries are charged in the order of B3, . . . , Bn, that is, from the battery of the poorest discharging performance to the battery of the highest discharging performance, and the charging voltage is distributed to apply optimum charging voltages to the individual batteries connected in series, thereby preventing the individual batteries from either being overcharged or being undercharged.

In the above embodiment, the description is made as to a case where the batteries B1, B2, B3, . . . , and Bn are arranged in ascending order of performance. The charging voltage distribution apparatus for series batteries in accordance with the present invention, however, can be operated properly irrespective of the order in which the batteries having different performances are arranged. That is, irrespective of the position at which the poorest performance battery is arranged in the battery array, the charging of the poorest performance battery is completed first, and then the bypass current starts to flow from the thus fully charged battery to the bypass circuits associated therewith.

To adjust the charging voltages for individual batteries in compliance with changes in external or internal temperature of the battery array, the apparatus may be provided with one or more temperature thermistors fixed to the side of one or more batteries so as to control the optimal charging voltage for a respective battery while monitoring the battery array temperature.

As described in the foregoing, with the charging voltage distribution apparatus for series batteries in accordance with the present invention, when the charging voltage of a certain battery of the battery array is about to rise higher than necessary, the charging current for the thus completely charged battery is bypassed to the corresponding bypass circuits and is then supplied to any other battery having a lower charging voltage, so that the batteries can be uniformly charged independently of the properties of the individual batteries. Furthermore, optimal voltage can be distributed to all of the batteries connected in series. Even if batteries varying in performance are charged concurrently, the batteries will not be adversely affected from one another. Moreover, since undercharging and overcharging can be prevented effectively, the service lives of the batteries can be extended.

What is claimed is:

1. A charging voltage distribution apparatus for series batteries, comprising:

charging voltage distribution sections each of which is adapted to be connected in parallel with an associated one of the series batteries, said each charging voltage distribution section including a bypass circuit and a control circuit;

said bypass circuit of said each charging voltage distribution section being connected in parallel with the associated battery; and said control circuit of said each charging voltage distribution section being operable to continuously variably control an amount of current flowing through the associated bypass circuit according to a charging voltage applied to the associated battery.

2. The charging voltage distribution apparatus according to claim 1, wherein said control circuit of said each charging voltage distribution section causes the current to flow through the associated bypass circuit when the charging voltage applied to the associated battery exceeds a predetermined value.

3. The charging voltage distribution apparatus according to claim 1, wherein:

said bypass circuit of said each charging voltage distribution section includes a switching device; and said control circuit of said each charging voltage distribution section changes a turn-on duration of the associated switching device according to the charging voltage applied to the associated battery.

4. The charging voltage distribution apparatus according to claim 1, wherein:

said bypass circuit of said each charging voltage distribution section includes a switching device said control circuit of said each charging voltage distribution section includes:

a first reference voltage generator for generating a first reference voltage;

a first voltage detecting circuit for detecting a first voltage corresponding to the charging voltage applied to the associated battery; and a control signal output circuit for determining a first voltage difference between said detected first voltage and said first reference voltage and outputting a control signal which varies according to said first voltage difference, said switching device of the associated charging voltage distribution section being turned on when supplied with said control signal.

5. The charging voltage distribution apparatus according to claim 4, wherein said control signal output circuit supplies the associated switching device with the control signal in the form of a series of pulses at those intervals of time which vary according to said first voltage difference, thereby changing that on-off duty ratio of the associated switching device which determines a turn-on duration of the switching device.

6. The charging voltage distribution apparatus according to claim 4, wherein:

said control circuit of said each charging voltage distribution section further includes a second reference voltage generator for generating a second reference voltage, and a second voltage detecting circuit for detecting a second voltage corresponding to the charging voltage applied to the associated battery;

said first and second reference voltages are set in accordance with an optimum charging voltage of and a maximum allowable charging voltage of the associated battery, respectively;

said control circuit of said each charging voltage distribution section includes a first voltage difference output circuit for receiving said first reference voltage and said first voltage and for outputting said first voltage difference, and a second voltage difference output circuit for receiving said second reference voltage and said second voltage and for outputting a second voltage difference therebetween, said control circuit outputting the control signal which varies according to a difference between the first voltage difference and the second voltage difference.

7. The charging voltage distribution apparatus according to claim 6, wherein said first and second voltage detecting circuits include a first voltage divider having a first voltage division ratio and a second voltage divider having a second voltage division ratio, respectively, to output those first and second voltages which vary according to the first and second voltage division ratios and the charging voltage applied to the associated battery, respectively.

8. The charging voltage distribution apparatus according to claim 6, wherein the turn-on duration of said switching device of said each charging voltage distribution section varies based on said first and second reference voltages provided by said first and second reference voltage generators and the charging voltage applied to the associated battery.

9. The charging voltage distribution apparatus according to claim 6, wherein said control signal output circuit outputs that control signal which gradually increases the turn-on duration of the associated switching device from a moment at which said first voltage difference reaches a predetermined value to a moment at which said second voltage difference reaches a predetermined value as the charging voltage applied to the associated battery increases, and outputs that control signal which prevents a further increase in the turn-on duration of the associated switching device caused by a further increase in the charging voltage after said second voltage difference reaches its predetermined value.

10. The charging voltage distribution apparatus according to claim 9, wherein said control signal output circuit outputs that control signal which changes a maximum turn-on duration of the associated switching device according to a product of at least one of said first and second voltage division ratios and a difference between said first and second reference voltages.

11. The charging voltage distribution apparatus according to claim 6, wherein said control signal output circuit supplies the associated switching device with the control signal in the form of a series of pulses at those intervals of time which vary according to said difference between said first and second voltage differences, thereby changing that on-off duty ratio of the associated switching device which determines a turn-on duration of the switching device.

12. The charging voltage distribution apparatus according to claim 11, wherein said control signal output circuit includes a voltage-to-frequency converter circuit for converting a voltage corresponding to said difference between said first and second voltage differences into a frequency, and supplies the associated switching device with the control signal of that frequency which becomes higher as said difference between said first and second voltage differences becomes greater.

13. The charging voltage distribution apparatus according to claim 5, wherein said control signal output circuit includes a voltage-to-frequency converter circuit for converting a voltage corresponding to said first voltage difference into a frequency, and supplies the associated switching device with the control signal of that frequency which becomes higher as said first voltage difference becomes greater.

14. The charging voltage distribution apparatus according to claim 1, wherein each of said charging voltage distribution sections includes a plurality of bypass circuits each including said switching device.

15. A charging voltage distribution device for series batteries, which device is adapted to be connected in parallel with a battery of the series batteries, comprising:
a bypass circuit connected in parallel with the battery and including a switching device; and
a control circuit for continuously variably controlling an amount of current flowing through said bypass circuit according to a charging voltage applied to the battery;
wherein said control circuit includes a first reference voltage generator for generating a first reference voltage, a first voltage detecting circuit for detecting a first voltage corresponding to the charging voltage applied to the battery, and a control signal output circuit for determining a first voltage difference between said detected first voltage and said first reference voltage and for outputting a control signal which varies according to said first voltage difference, said switching device being turned on when supplied with said control signal; and wherein said control signal output circuit supplying the switching device with the control signal in the form of a series of pulses at those intervals of time which vary according to said first voltage difference, thereby changing that on-off duty ratio of the switching device which determines a turn-on duration of the switching device.

16. The charging voltage distribution device according to claim 15, wherein:
said control circuit further includes a second reference voltage generator for generating a second reference voltage, and a second voltage detecting circuit for detecting a second voltage corresponding to the charging voltage applied to the battery;
said first and second reference voltages are set in accordance with an optimum charging voltage of and a maximum allowable charging voltage of the battery, respectively;
said control circuit includes a first voltage difference output circuit for receiving said first reference voltage and said first voltage and for outputting said first voltage difference, and a second voltage difference output circuit for receiving said second reference voltage and said second voltage and for outputting a second voltage difference therebetween, said control circuit outputting the control signal which varies according to a difference between the first voltage difference and the second voltage difference.

17. The charging voltage distribution device according to claim 16, wherein said control signal output circuit outputs that control signal which gradually increases the turn-on duration of the switching device from a moment at which said first voltage difference reaches a predetermined value to a moment at which said second voltage difference reaches a predetermined value to a moment at which said second voltage difference reaches a predetermined value as the charging voltage applied to the battery increases, and outputs that control signal which prevents a further increase in the turn-on duration of the switching device caused by a further increase in the charging voltage after said second voltage difference reaches its predetermined value.

18. The charging voltage distribution device according to claim 16, wherein said control signal output circuit supplies the switching device with the control signal in the form of a series of pulses at those intervals of time which vary according to said difference between said first and second voltage differences, thereby changing that on-off duty ratio of the switching device which determines a turn-on duration of the switching device.

19. The charging voltage distribution device according to claim 18, wherein said control signal output circuit includes a voltage-to-frequency converter circuit for converting a voltage corresponding to said difference between said first and second voltage differences into a frequency, and supplies the switching device with the control signal of that frequency which becomes higher as said difference between said first and second voltage differences becomes greater.

20. The charging voltage distribution device according to claim 15, wherein said control signal output circuit includes a voltage-to-frequency converter circuit for converting a voltage corresponding to said first voltage difference into a frequency, and supplies the switching device with the control signal of that frequency which becomes higher as said first voltage difference becomes greater.

21. The charging voltage distribution device according to claim 15, comprising a plurality of bypass circuits each including said switching device.

22. A charging voltage distribution apparatus for series batteries, comprising:

bypass circuits including switching devices; and a control circuit for controlling an amount of current to be routed into said bypass circuits according to the voltage of a battery connected to said bypass circuits;

said control circuit including:

reference voltage generators for generating reference voltages;

voltage detecting circuits for detecting voltages corresponding to battery voltage;

a control signal output circuit for calculating a voltage difference among said detected voltages and reference voltages and outputting control signals according to said voltage difference; and circuits for actuating said switching devices in said bypass circuits according to said control signals;

wherein when a voltage difference between voltages provided by a pair of said reference voltage generator and voltage detecting circuit becomes zero, said switching devices close said bypass circuits to cause said duty ratio of the on- and off-state durations of said switching devices to increase, while when a voltage difference between voltages provided by the other pair of said reference voltage generator and voltage detecting circuit becomes zero, said switching devices prevent said duty ratio from increasing.

* * * * *

UNITED STATES PATENT AND TRADEMARK OFFICE
CERTIFICATE OF CORRECTION

PATENT NO. : 5,675,233
DATED : October 7, 1997
INVENTOR(S) : Akira Kaneko, Takashi Hiramatsu It is certified that error appears in the above-indentified patent and that said Letters Patent is hereby corrected as shown below:

ON THE TITLE PAGE:

Item [30] Please change the Foreign Application Priority No. from "7-887477" to --7-87477--.

Signed and Sealed this

Fourth Day of August, 1998

Attest:

BRUCE LEHMAN

Attesting Officer

Commissioner of Patents and Trademarks